US006815490B2

(12) United States Patent
Seelert et al.

(10) Patent No.: US 6,815,490 B2
(45) Date of Patent: Nov. 9, 2004

(54) TOUGHENED PROPYLENE POLYMERS HAVING LITTLE TENDENCY TO WHITE FRACTURE

(75) Inventors: Stefan Seelert, Frankenthal (DE); Klaus-Dieter Rümpler, Wachenheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/351,715

(22) Filed: Jan. 28, 2003

(65) Prior Publication Data

US 2003/0176580 A1 Sep. 18, 2003

Related U.S. Application Data

(62) Division of application No. 08/916,389, filed on Aug. 22, 1997, now abandoned.

(30) Foreign Application Priority Data

Sep. 2, 1996 (DE) .......................................... 196 35 503

(51) Int. Cl.$^7$ ............................................... C08L 23/04
(52) U.S. Cl. ...................................... 524/451; 525/240
(58) Field of Search ........................... 524/451; 625/240

(56) References Cited

U.S. PATENT DOCUMENTS

| | | | | |
|---|---|---|---|---|
| 4,020,264 A | | 4/1977 | Hotta et al. .................. | 526/142 |
| 4,514,513 A | | 4/1985 | Sato et al. ................... | 502/112 |
| 4,533,705 A | | 8/1985 | Sato et al. ................... | 526/114 |
| 4,794,096 A | | 12/1988 | Ewen .......................... | 502/117 |
| 4,857,613 A | | 8/1989 | Zolk et al. ................... | 526/128 |
| 4,966,944 A | | 10/1990 | Kiang .......................... | 525/88 |
| 5,258,464 A | | 11/1993 | McCullough, Jr. et al. . | 525/244 |
| 5,288,824 A | | 2/1994 | Kerth et al. .................. | 526/128 |
| 5,371,260 A | | 12/1994 | Sangokoya ................... | 556/171 |
| 5,391,793 A | | 2/1995 | Marks et al. ................. | 556/179 |
| 5,773,515 A | * | 6/1998 | Srinivasan et al. .......... | 525/240 |
| 5,854,354 A | * | 12/1998 | Ueda et al. .................. | 525/322 |
| 5,929,147 A | | 7/1999 | Pierick et al. ............... | 525/240 |
| 5,985,971 A | | 11/1999 | Srinivasan et al. .......... | 524/451 |
| 5,998,524 A | | 12/1999 | Srinivasan et al. .......... | 524/451 |
| 6,231,936 B1 | | 5/2001 | Kozimor et al. ............. | 525/240 |

FOREIGN PATENT DOCUMENTS

| | | |
|---|---|---|
| DE | 171 200 | 2/1986 |
| DE | 43299292 | 8/1993 |
| DE | 42 16 548 | 11/1993 |
| DE | 44 07 327 | 9/1995 |
| DE | 195 17 716 | 12/1995 |
| EP | 284 708 | 10/1988 |
| EP | 593 221 | 4/1994 |
| EP | 605 180 | 7/1994 |
| EP | 621 279 | 10/1994 |
| EP | 633 264 | 1/1995 |
| EP | 692 499 | 1/1996 |
| GB | 2 111 066 | 6/1983 |
| WO | WO 91/09882 | 7/1991 |
| WO | WO 94/06859 | 3/1994 |
| WO | WO96/06132 | 2/1996 |

OTHER PUBLICATIONS

Yu et al., "Polyolefin Modification with EXACT Plastomers", SPE RETEC Polyolefins VII Conference, Houston TX, Feb. 1993.*
Whelan, "Polymer Technology Dictionary", $2^{nd}$ ed., Chapman & Hall, New York, p. 213(1994).*
ACT Polymerica 42 (1991) Nr. 11, pp. 584–589.
Sec. 4.3 Measurements on Adsorbate–Free Ionic Solids.
JP 56–100896 Derwent Abstract, Accession No. 1981–6496D (1981).
JP 56–120712 Derwent Abstract Accession No. 1981–49725D (1981).

\* cited by examiner

*Primary Examiner*—Bernard Lipman
(74) *Attorney, Agent, or Firm*—Keil & Weinkauf

(57) ABSTRACT

Propylene polymers contain
a) from 50 to 95 parts by weight of a propylene homopolymer having a melt flow index of from 0.1 to 100 g/10 min., at 230° C. and under a weight of 2.16 kg, according to ISO standard 1133, and an isotacticity index of at least 98%,
b) from 5 to 50 parts by weight of an ethylene copolymer containing from 4 to 40% by weight of polymerized $C_4$-$C_{20}$-alk-1-ene and having a density of from 0.865 to 0.920 g/cm$^3$ and
c) from 0 to 1.5 parts by weight of a nucleating agent, the sum of the parts by weight of the propylene homopolymer a) and of the ethylene copolymer b) always being 100 parts by weight.

The propylene polymers are distinguished in particular by high rigidity and little tendency to white fracture.

19 Claims, No Drawings

TOUGHENED PROPYLENE POLYMERS HAVING LITTLE TENDENCY TO WHITE FRACTURE

"This application is a divisional application of Ser. No. 08/916,389, filed Aug. 22, 1997," now abandoned.

The present invention relates to propylene polymers containing
a) from 50 to 95 parts by weight of a propylene homopolymer having a melt flow index of from 0.1 to 100 g/10 min. at 230° C. and under a weight of 2.16 kg, according to ISO standard 1133, and an isotacticity index of at least 98%,
b) from 5 to 50 parts by weight of an ethylene copolymer containing from 4 to 40% by weight of polymerized $C_4$–$C_{20}$-alk-1-ene and having a density of from 0.865 to 0.920 g/cm³ and
c) from 0 to 1.5 parts by weight of a nucleating agent, the sum of the parts by weight of the propylene homopolymer a) and of the ethylene copolymer b) always being 100 parts by weight.

The present invention furthermore relates to a process for the preparation of these polymers and to their use as films, fibers and moldings.

The preparation of propylene homopolymers by Ziegler-Natta polymerization has long been known. The catalyst components used contain, inter alia, compounds of polyvalent titanium, aluminum halides and/or alkyls, as well as electron donor compounds, silanes, esters, ketones or lactones generally being used (DE-A 42 16 548, DE-A 44 19 438, EP-A 171 200, EP-A 530 599, U.S. Pat. No. 4,857,613).

In this process, propylene homopolymers having very different properties can be obtained, for example having substantially different rigidity, impact strength or flowability. Some applications in which propylene polymers are preferably used require in particular propylene polymers which, in addition to a high impact strength, also have, for optical reasons, a substantially reduced tendency to white fracture and high rigidity.

In addition to the preparation of propylene polymers by means of Ziegler-Natta catalysts, it is has also been possible for some years to prepare polymers of propylene and of ethylene with the use of metallocene catalysts having cyclic ligands (EP-A 519 237, EP-A 692 499).

DE-A 4407327 describes propylene polymers which consist of a propylene homopolymer and a nucleating agent and are distinguished, inter alia, by high rigidity and flowability. For certain applications of propylene polymers, however, even higher rigidity and improved white fracture behavior are of interest.

EP-A 593 221 discloses mixtures of propylene polymers and ethylene copolymers with polymerized $C_4$–$C_{18}$-alk-1-enes, whose density is less than or equal to 0.913 g/cm³. The blends mentioned therein have good impact strength and rigidity, but the manner in which the white fracture behavior of such products can be improved is not described.

Furthermore, WO-A 94/06859 claims blends of thermoplastic polymers and linear ethylene copolymers with polymerized $C_3$–$C_{20}$-alk-1-enes, which have, inter alia, high transparency and good impact strength at low temperatures. However, WO-A 94/06859 does not indicate how the white fracture behavior of such blends can be improved and at the same time their rigidity increased.

It is an object of the present invention to remedy the disadvantages described and to provide an improved propylene polymer which is distinguished by an advantageous property profile in terms of good impact strength, flowability and processability and moreover has high rigidity and very little tendency to white fracture.

We have found that this object is achieved by novel propylene polymers containing
a) from 50 to 95 parts by weight of a propylene homopolymer having a melt flow index of from 0.1 to 100 g/10 min. at 230° C. and under a weight of 2.16 kg, according to ISO standard 1133, and an isotacticity index of at least 98%,
b) from 5 to 50 parts by weight of an ethylene copolymer containing from 4 to 40% by weight of polymerized $C_4$–$C_{20}$-alk-1-ene and having a density of from 0.865 to 0.920 g/cm³ and
c) from 0 to 1.5 parts by weight of a nucleating agent, the sum of the parts by weight of the propylene homopolymer a) and of the ethylene copolymer b) always being 100 parts by weight.

Propylene polymers which contain
a) from 60 to 90, in particular from 75 to 90, parts by weight of the propylene homopolymer a),
b) from 10 to 40, in particular from 10 to 25, parts by weight of the ethylene copolymer b) and
c) from 0 to 1.5, in particular from 0.05 to 1.5, parts by weight of the nucleating agent c) are particularly preferred.

The sum of the parts by weight of the propylene homopolymer and of the ethylene copolymer b) is always 100 parts by weight.

A preferably used propylene homopolymer a) is one which has a melt flow index of from 0.2 to 50 g/10 min at 230° C. and under a weight of 2.16 kg, according to ISO standard 1133. The melt flow index corresponds to the amount of polymer in grams which is forced, at 230° C. and under a weight of 2.16 kg, out of the test apparatus standardized according to ISO standard 1133.

The novel propylene polymer contains in particular a propylene homopolymer a) whose isotacticity index is at least 98.0%, preferably from 98.0% to 99.5%. The isotacticity index is to be understood as meaning that proportion of polymer which is insoluble in xylene according to ISO standard 6427 b). The isotacticity index is a measure of the stereospecificity of the propylene homopolymer.

The process leading to these propylene homopolymers a) can be carried out either batchwise or, preferably, continuously in the conventional reactors used for the polymerization of propylene. Suitable reactors include continuously operated stirred kettles. The reactors contain a fixed bed of finely divided polymer, which is usually kept in motion by stirring.

The process can be carried out with the Ziegler-Natta catalysts conventionally used in polymerization technology. In addition to a titanium-containing solid component, these also contain, inter alia, a cocatalyst. A suitable cocatalyst is an aluminum compound. In addition to this aluminum compound, an electron donor compound is also used as a further component of the cocatalyst.

For the preparation of the titanium-containing solid component, the titanium compounds used are in general halides or alcoholates of trivalent or tetravalent titanium, the chlorides of titanium, in particular titanium tetrachloride, being preferred. The titanium-containing solid component advantageously contains a finely divided carrier, for which silicas and aluminas as well as aluminum silicates of the empirical formula $SiO_2 \cdot aAl_2O_3$, where a is from 0.001 to 2, in particular from 0.01 to 0.5, have proven useful.

The preferably used carriers have a particle diameter of from 0.1 to 1000 μm, in particular from 10 to 300 μmm, a pore volume of from 0.1 to 10, in particular from 1.0 to 5.0, cm³/g and a specific surface area of from 10 to 1000, in particular from 100 to 500, m²/g.

In particular, a finely divided inorganic oxide which has a pH of from 1 to 6, a mean particle diameter of from 5 to 200 µm, in particular from 20 to 70 µm and a mean primary particle diameter of from 1 to 20 µm, in particular from 1 to 5 µm, may be used as the finely divided carrier for the titanium-containing solid component. The primary particles are porous, granular oxide particles which are obtained from a corresponding hydrogel by milling, if necessary after sieving has been carried out. The hydrogel is produced in the acidic range, ie. at a pH of from 1 to 6, or is aftertreated with appropriately acidic wash solutions and purified.

Inter alia, the finely divided inorganic oxide also has cavities or channels having an average diameter of from 0.1 to 20 µm, in particular from 1 to 15 µm, whose macroscopic volume fraction is from 5 to 30%, in particular from 10 to 30%, based on the total particle. The finely divided inorganic oxide furthermore has in particular a pore volume of from 0.1 to 10, preferably from 1.0 to 4.0, cm³/g and a specific surface area of from 10 to 1000, preferably from 100 to 500, m²/g. The pH, ie. the negative decadic logarithm of the proton concentrations of the inorganic oxide is from 1 to 6, in particular from 2 to 5.

Preferred inorganic oxides are in particular oxides of silicon, of aluminum, of titanium or of one of the metals of main group I or II of the Periodic Table. In addition to alumina or magnesium oxide or a sheet silicate, another very preferably used oxide is silica gel ($SiO_2$), which can be obtained, in particular, by spray-drying. It is also possible to use cogels, ie. mixtures of two different inorganic oxides. However, such finely divided inorganic oxides are also commercially available.

Inter alia, compounds of magnesium are also used in the preparation of the titanium-containing solid component. Particularly suitable compounds of this type are magnesium halides, alkylmagnesiums and arylmagnesiums, as well as alkoxymagnesium and aryloxymagnesium compounds, magnesium chloride, magnesium bromide and di($C_1$–$C_{10}$-alkyl)magnesium compounds being preferably used. In addition, the titanium-containing solid component may contain halogen, preferably chlorine or bromine.

The titanium-containing solid component furthermore contains electron donor compounds, for example mono- or polyfunctional carboxylic acids, carboxylic anhydrides and carboxylic esters, ketones, ethers, alcohols, lactones and organophosphorus and organosilicon compounds. Preferably used electron donor compounds within the titanium-containing solid component are phthalic acid derivatives of the general formula I

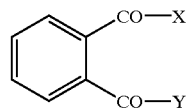

where X and Y are each chlorine or a $C_1$–$C_{10}$-alkoxy or together are oxygen. Particularly preferred electron donor compounds are phthalic esters, where X and Y are each $C_1$–$C_8$-alkoxy, for example methoxy, ethoxy, propoxy or butoxy.

Further preferred electron donor compounds within the titanium-containing solid component include diesters of 3- or 4-membered, unsubstituted or substituted cycloalkane-1,2-dicarboxylic acids and monoesters of unsubstituted or substituted benzophenone-2-carboxylic acids. Hydroxy compounds used in the case of these esters are the alcohols conventionally employed in esterification reactions, including $C_1$–$C_{15}$-alkanols, $C_5$–$C_7$-cycloalkanols, which in turn may carry $C_1$–$C_{10}$-alkyl groups, and phenols, naphthols and the $C_1$–$C_{10}$-alkyl derivatives of these compounds.

The titanium-containing solid components can be prepared by methods known per se. Examples of these are described, inter alia, in EP-A 171 200, GB-A 2 111 066, U.S. Pat. Nos. 4,857,613 and 5,288,824.

In the preparation of the titanium-containing solid component, the following three-stage process is preferably used.

In the first stage, a solution of the magnesium-containing compound in a liquid alkane is first added to a finely divided carrier, preferably silica or $SiO_2.aAl_2O_3$, where a is a number from 0.001 to 2, in particular from 0.01 to 0.5, after which this mixture is stirred for from 0.5 to 5 hours at from 10 to 120° C. Preferably, from 0.1 to 1 mol of the magnesium compound is used per mole of the carrier. A halogen or a hydrogen halide, in particular chlorine or hydrogen chloride, is then added, with continuous stirring, in an at least two-fold, preferably at least five-fold, molar excess, based on the magnesium-containing component. After from about 30 to 120 minutes, the solid is isolated from the liquid phase.

In the second stage, the product obtained in this manner is introduced into a liquid alkane, and a $C_1$–$C_8$-alkanol, in particular ethanol, a halide or an alcoholate of trivalent or tetravalent titanium, in particular titanium tetrachloride, and an electron donor compound, in particular a phthalic acid derivative of the general formula I, are then added. From 1 to 5, in particular from 2 to 4, mol of alkanol, from 2 to 20, in particular from 4 to 10, mol of trivalent or tetravalent titanium and from 0.01 to 1, in particular from 0.1 to 1.0, mol of the electron donor compound are used per mole of magnesium in a solid obtained in the first stage. This mixture is stirred for at least one hour at from 10 to 150° C. and the solid substance thus obtained is then filtered off and is washed with a liquid alkane, preferably with hexane or heptane.

In the third stage, the solid obtained in the second stage is extracted for some hours at from 100 to 150° C. with excess titanium tetrachloride or with an excess of a solution of titanium tetrachloride in an inert solvent, preferably an alkylbenzene, the solvent containing at least 5% by weight of titanium tetrachloride. The product is then washed with a liquid alkane until the titanium tetrachloride content of the wash liquid is less than 2% by weight.

The titanium-containing solid component obtainable in this manner is used with a cocatalyst as the Ziegler-Natta catalyst system. A suitable cocatalyst is an aluminum compound.

Suitable aluminum compounds in addition to trialkylaluminum are also those compounds in which an alkyl group is replaced by an alkoxy group or by a halogen atom, for example by chlorine or bromine.

Preferably used trialkylaluminum compounds are those whose alkyl groups are each of 1 to 8 carbon atoms, for example trimethyl-, triethyl- or methyldiethylaluminum.

Further cocatalysts which are preferably used in addition to the aluminum compound are electron donor compounds, for example mono- or polyfunctional carboxylic acids, carboxylic anhydrides and carboxylic esters, ketones, ethers, alcohols, lactones and organophosphorus and organosilicon compounds. Particularly suitable electron donor compounds are organosilicon compounds of the general formula II

where the radicals R' are identical or different and are each $C_1$–$C_{20}$-alkyl, 5- to 7-membered cycloalkyl, which in turn may carry a $C_1$–$C_{10}$-alkyl, or a $C_6$–$C_{20}$-arylalkyl, the radicals R" are identical or different and are each $C_1$–$C_{20}$-alkyl and n is 1, 2 or 3. Particularly preferred compounds are those in which R' is $C_1$–$C_8$-alkyl or 5- to 7-membered cycloalkyl, R" is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane, dimethoxy-sec-butylisopropylsilane, diethoxydicyclopentylsilane, diethoxy-sec-butylisopropylsilane and diethoxyisobutylisopropylsilane are noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as the cocatalyst is from 1:1 to 100:1, in particular from 2:1 to 20:1. The catalyst components may be introduced into the polymerization system individually in any desired order or as a mixture of components.

The polymerization for the preparation of the propylene homopolymers a) is usually carried out at from 20 to 40 bar and from 60 to 90° C. and with an average residence time of the reaction mixture of from 0.5 to 5 hours. Pressures of from 25 to 35 bar, temperatures of from 65 to 85° C. and average residence times of from 1.0 to 4 hours are preferred. The polymerization conditions are usually chosen so that from 0.05 to 2, preferably from 0.1 to 1.5, kg of the propylene homopolymer a) are formed per mmol of the aluminum component.

The molecular weight of the polymers obtainable in this way can be controlled in the usual manner by adding regulators, in particular hydrogen. $C_2$–$C_6$-Alk-1-enes, for example ethylene or but-1-ene, may also be used as regulators. In this case, the propylene homopolymer a) may also contain up to 0.1% by weight of other $C_2$–$C_6$-alk-1-enes.

A particularly used ethylene copolymer b) is a copolymer which contains from 4 to 40, preferably from 7 to 30, % by weight of polymerized $C_4$–$C_{20}$-alk-1-enes. Preferred comonomers in the ethylene copolymer b) are $C_4$–$C_{12}$-alk-1-enes, but-1-ene, pent-1-ene, 4-methylpent-1-ene, hex-1-ene, hept-1-ene or oct-1-ene or mixtures of these $C_4$–$C_{12}$-comonomers being preferably used. Particularly suitable comonomers are but-1-ene, hex-1-ene and oct-1-ene.

The ethylene copolymers b) present in the novel ethylene copolymers b) have a density of from 0.865 to 0.920, in particular from 0.868 to 0.910, g/cm³. The melt flow index at 230° C. and under a weight of 2.16 kg, according to ISO standard 1133, is from 0.1 to 100, in particular from 1 to 30, g/10 min.

The ethylene copolymers b) contained in the novel propylene polymers are usually prepared by appropriate polymerization using metal-containing catalysts, for example using catalysts based on a metallocene complex or with the aid of titanium- and aluminum-containing Ziegler catalysts, or by means of Phillips catalysts based on chromium-containing compounds. The polymerization reaction can be carried out using the reactors usually employed in industry, either in the gas phase, in solution, in liquid monomers or in a suspension. Polymerization may be effected continuously, semicontinuously or batchwise.

The ethylene copolymers b) are preferably prepared by polymerization of ethylene and the corresponding $C_4$–$C_{20}$-alk-1-enes with the aid of catalyst systems which contain
A) if required, an inorganic carrier,
B) at least one metallocene complex,
C) at least one compound forming metallocenium ions and
D) if required, at least one organic metal compound of an alkali metal or alkaline earth metal or of a metal of main group III of the Periodic Table.

The polymerization with the aid of such metallocene-containing catalyst systems, which leads to the ethylene copolymers b), is carried out in particular at from –50 to 300° C., preferably from 0 to 150° C., and at from 0.5 to 3000, preferably from 1 to 80, bar. In this process, the residence times of the respective reaction mixtures should be set at from 0.5 to 5, in particular from 0.7 to 3.5, hours. Inter alia, antistatic agents and molecular weight regulators, for example hydrogen, may also be present during the polymerization.

The polymerization can be carried out in solution, in suspension, in liquid monomers or in the gas phase. The polymerization is preferably carried out in suspension or in the gas phase.

The polymerization process for the preparation of the copolymers b) may be carried out either continuously or batchwise. Suitable reactors include continuously operated stirred kettles, and, if necessary, a plurality of stirred kettles connected in series may also be used (reactor cascade).

Such metallocene-containing catalyst systems contain, if required, an inorganic carrier as component A). In particular, an inorganic oxide which has a pH of from 1 to 6, determined according to S. R. Morrison, "The Chemical Physics of Surfaces", Plenum Press, New York [1977], page 130 et seq., and cavities and channels whose macroscopic volume fraction is from 5 to 30% of the total particle is used as the inorganic carrier. Particularly preferably used inorganic oxides are those whose pH, ie. whose negative decadic logarithm of the proton concentration, is from 2 to 5.5, in particular from 2 to 5. In particular, those inorganic oxides which have cavities and channels whose macroscopic volume fraction is from 8 to 30%, preferably from 10 to 30%, and particularly preferably from 15 is 25%, of the total particle are furthermore used as inorganic carriers.

Further preferably used inorganic carriers include those inorganic oxides which have a mean particle diameter of from 5 to 200 μm, in particular from 20 to 90 μm, and a mean primary particle diameter of from 1 to 20 μm, in particular from 1 to 5 μm. The primary particles are porous, granular particles and have pores with a diameter of, in particular, from 1 to 1000 Å. Furthermore, such inorganic oxides have, inter alia, cavities and channels having an average diameter of from 0.1 to 20 μm, in particular from 1 to 15 μm. The inorganic oxides furthermore have, in particular, a pore volume of from 0.1 to 10, preferably from 1.0 to 5.0, cm³/g and a specific surface area of from 10 to 1000, preferably from 100 to 500, m²/g.

Owing to the cavities and channels present in the finely divided inorganic oxides, there is a substantially improved distribution of catalyst active components in the carrier. The acidic centers at the surface of the inorganic oxide additionally result in homogeneous loading with the catalyst components. In addition, a material containing cavities and channels throughout in this manner has an advantageous effect on the diffusion-controlled supply with monomers and cocatalysts and hence also on the polymerization kinetics.

Such a finely divided inorganic oxide is obtainable, inter alia, by spray-drying milled, appropriately sieved hydrogels, which for this purpose are converted into a slurry with water or with an aliphatic alcohol. During the spray-drying, the required pH of from 1 to 6 can also be established by the use of appropriately acidic suspensions of primary particles. However, such a finely divided inorganic oxide is also commercially available.

Preferred inorganic carriers are in particular oxides of silicon, of aluminum, of titanium or of one of the metals of main group I or II of the Periodic Table. In addition to alumina or magnesium oxide or a sheet silicate, another very preferably used inorganic oxide is silica gel ($SiO_2$), which can be obtained, in particular, by spray-drying.

Cogels, ie. mixtures of at least two different inorganic oxides, may also be used as component A).

From 0.1 to 10000, in particular from 5 to 200, $\mu$mol of the metallocene complex, ie. of component B), are preferably used per gram of carrier, ie. of component A).

The preferably used metallocene-containing catalyst system contains, as component B), at least one or more metallocene complexes. Particularly suitable metallocene complexes are those of the general formula IV

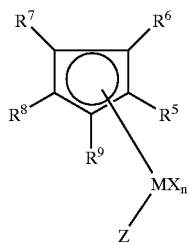

IV where
- M is titanium, zirconium, hafnium, vanadium, niobium or tantalum or an element of subgroup III of the Periodic Table or a lanthanoid,
- X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^{10}$ or —$NR^{10}R^{11}$,
- n is an integer from 1 to 3 and corresponds to the valency of M minus 2,
- $R^{10}$ and $R^{11}$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical,
- $R^5$ to $R^9$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may form a saturated or unsaturated cyclic group of 4 to 15 carbon atoms, or $Si(R^{12})_3$,
- $R^{12}$ is $C_1$–$C_{10}$-alkyl, $C_3$–$C_{10}$-cycloalkyl or $C_6$–$C_{15}$-aryl,
- Z is X or

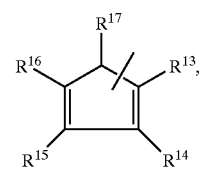

- $R^{13}$ to $R^{17}$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may furthermore form a saturated or unsaturated cyclic group of 4 to 15 carbon atoms, or $Si(R^{18})_3$,
- $R^{18}$ is $C_1$–$C_{10}$-alkyl, $C_6$–$C_{15}$-aryl or $C_3$–$C_{10}$-cycloalkyl, or $R^8$ and Z together form a group —$R^{19}$—A—,

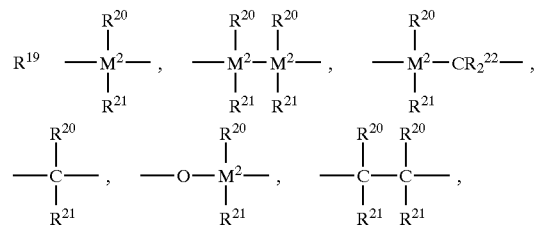

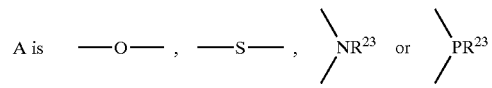

- $R^{20}$, $R^{21}$ and $R^{22A}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl or two adjacent radicals together with the atoms linking them form a ring, and
- $M^2$ is silicon, germanium or tin,

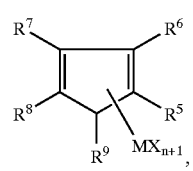

- $R^{23}$ is $C_1$–$C_{10}$-alkyl, $C_6$–$C_{15}$-aryl, $C_3$–$C_{10}$-cycloalkyl, alkylaryl or $Si(R^{24})_3$, and
- $R^{24}$ is hydrogen or $C_1$–$C_{10}$-alkyl or is $C_6$–$C_{15}$-aryl which in turn may be substituted by $C_1$–$C_4$-alkyl, or is $C_3$–$C_{10}$-cycloalkyl, or $R^8$ and $R^{16}$ together form a group —$R^{19}$13.

Preferred metallocene complexes of the general formula IV are

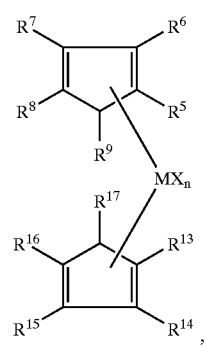

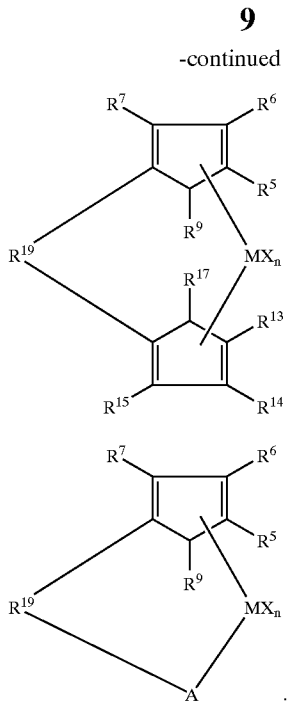

The radicals X may be identical or different but are preferably identical.

Particularly preferred compounds of the formula IVa are those in which

M is titanium, zirconium or hafnium,
X is chlorine, $C_1$–$C_4$-alkyl or phenyl,
n is 2 and
$R^5$ to $R^9$ are each hydrogen or $C_1$–$C_4$-alkyl.

Preferred compounds of the formula IVb are those in which

M is titanium, zirconium or hafnium,
X is chlorine, $C_1$–$C_4$-alkyl or phenyl,
n is 2,
$R^5$ to $R^9$ are each hydrogen, $C_1$–$C_4$-alkyl or $Si(R^{12})_3$, and
$R^{13}$ to $R^{17}$ are each hydrogen, $C_1$–$C_4$-alkyl or $Si(R^{18})_3$.

Particularly suitable compounds of the formula IVb are those in which the cyclopentadienyl radicals are identical.

Examples of particularly suitable compounds include:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and the corresponding dimethylzirconium compounds.

Particularly suitable compounds of the formula IVc are those in which $R^5$ and $R^{13}$ are identical and are each hydrogen or $C_1$–$C_{10}$-alkyl,
$R^9$ and $R^{17}$ are identical and are each hydrogen, methyl, ethyl, isopropyl or tert-butyl,
$R^7$ and $R^{15}$ are each $C_1$–$C_4$-alkyl,
$R^6$ and $R^{14}$ are each hydrogen
or two adjacent radicals $R^6$ and $R^7$ on the one hand and $R^{14}$ and $R^{15}$ on the other hand together form a cyclic group of 4 to 12 carbon atoms,

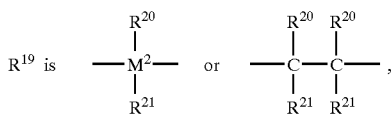

M is titanium, zirconium or hafnium and
X is chlorine, $C_1$–$C_4$-alkyl or phenyl.

Examples of particularly suitable complex compounds include dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride and
diphenylsilanediylbis(2-methylindenyl)hafnium dichloride and the corresponding dimethylzirconium compounds.

Further examples of suitable complex compounds include dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methyl-4-isopropylindenyl)zirconium dichloride and dimethylsilanediylbis(2-methyl-4,6-diisopropylindenyl) zirconium dichloride and the corresponding dimethylzirconium compounds.

Particularly suitable compounds of the general formula IVd are those in which

M is titanium or zirconium,

X is chlorine, $C_1$–$C_4$-alkyl or phenyl,

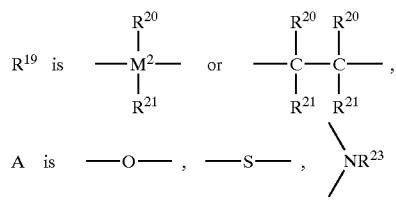

and $R^5$ to $R^7$ and $R^9$ are each hydrogen, $C_1$–$C_{10}$-alkyl, $C_3$–$C_{10}$-cycloalkyl, $C_6$–$C_{15}$-aryl or $Si(R^{12})_3$, or two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem. 369 (1989), 359–370.

It is also possible to use mixtures of different metallocene complexes.

The metallocene-containing catalyst system preferably used for the preparation of the ethylene copolymers b) contains, as component C), a compound forming metallocenium ions.

Suitable compounds forming metallocenium ions are strong, neutral Lewis acids, ionic compounds having Lewis acid cations and ionic compounds having Brönsted acids as cations.

Preferred strong, neutral Lewis acids are compounds of the general formula V $$M^3X^1X^2X^3 \quad\quad V$$

where $M^3$ is an element of main group III of the Periodic Table, in particular B, Al, Ga, preferably B, and $X^1$, $X^2$ and $X^3$ are each hydrogen, $C_1$–$C_{10}$-alkyl, $C_6$–$C_{15}$-aryl, alkylaryl, aryl-alkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds are those of the general formula V where $X^1$, $X^2$ and $X^3$ are identical, preferably tris(pentafluorophenyl)borane.

Suitable ionic compounds having Lewis acid cations are compounds of the general formula VI $$[(Y^{a+})Q_1Q_2 \ldots Q_z]^{d+} \quad\quad VI$$

where

Y is an element of main groups I to VI or of subgroups I to VIII of the Periodic Table, $Q_1$ to $Q_z$ are radicals having a single negative charge, such as $C_1$–$C_{28}$-alkyl, $C_6$–$C_{15}$-aryl, alkylaryl, arylalkyl, haloalkyl, haloaryl, each having 6 to 20 carbon atoms in the aryl radical and 1 to 28 carbon atoms in the alkyl radical, $C_3$–$C_{10}$-cycloalkyl which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5, and d corresponds to the difference a–z, but d is greater than or equal to 1.

Carbonium cations, oxonium cations and sulfonium cations as well as cationic transition metal complexes are particularly suitable. Particular examples are the triphenylmethyl cation, the silver cation and the 1,1'-dimethylferrocenyl cation. They preferably have noncoordinating opposite ions, in particular boron compounds, as also mentioned in WO 91/09882, preferably tetrakis (pentafluorophenyl)borate.

Ionic compounds having Brönsted acids as cations and preferably also noncoordinating opposite ions are mentioned in WO 91/09882, a preferred cation being N,N-dimethylanilinium.

The amount of compounds forming metallocenium ions is preferably from 0.1 to 10 equivalents, based on the metallocene complex IV.

Particularly suitable compounds C) forming metallocenium ions are open-chain or cyclic alumoxane compounds of the general formula II or III

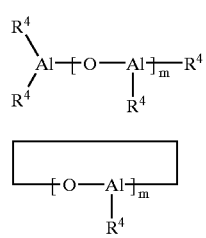

where $R^4$ is $C_1$–$C_4$-alkyl, preferably methyl or ethyl, and m is an integer from 5 to 30, preferably from 10 to 25.

The preparation of these oligomeric alumoxane compounds is usually carried out by reacting a solution of a trialkylaluminum with water and is described, inter alia, in EP-A 284 708 and U.S. Pat. No. 4,794,096.

As a rule, the oligomeric alumoxane compounds obtained in this way are present as mixtures of both linear and cyclic chain molecules of different lengths, so that m is to be regarded as an average value. The alumoxane compounds may also be present as a mixture with other metal alkyls, preferably with alkylaluminums.

Preferably, both the metallocene complexes (component B) and the compounds forming metallocenium ions (component C) are used in solution, aromatic hydrocarbons of 6 to 20 carbon atoms, in particular xylenes and toluene, being particularly preferred.

Aryloxyalumoxanes, as described in U.S. Pat. No. 5,391,793, aminoalumoxanes, as described in U.S. Pat. No. 5,371,260, aminoalumoxane hydrochlorides, as described in EP-A 633 264, silyloxyalumoxanes, as described in EP-A 621 279, or mixtures thereof may furthermore be used as component C).

It has proven advantageous to use the metallocene complexes and the oligomeric alumoxane compound in amounts such that the atomic ratio of aluminum from the oligomeric alumoxane compound to the transition metal from the metallocene complexes is from 10:1 to $10^6$:1, in particular from 10:1 to $10^4$:1.

The metallocene-containing catalyst system preferably used for the preparation of the ethylene copolymers b) may also contain, as component D), a metal compound of the general formula I $$M^1(R^1)_r(R^2)_s(R^3)_t \quad\quad I$$

where

M$^1$ is an alkali metal, an alkaline earth metal or a metal of main group III of the Periodic Table, ie. boron, aluminum, gallium, indium or thallium, R$^1$ is hydrogen, C$_1$–C$_{10}$-alkyl, C$_6$–C$_{15}$-aryl, alkylaryl or arylalkyl, each having 1 to 10 carbon atoms in the alkyl radical and 6 to 20 carbon atoms in the aryl radical, R$^2$ and R$^3$ are each hydrogen, halogen, C$_1$–C$_{10}$-alkyl, C$_6$–C$_{15}$-aryl, alkylaryl, arylalkyl or alkoxy, each having 1 to 10 carbon atoms in the alkyl radical and 6 to 20 carbon atoms in the aryl radical, r is an integer from 1 to 3 and s and t are integers from 0 to 2, the sum r+s+t corresponding to the valency of M$^1$.

Preferred metal compounds of the general formula I are those in which

M$^1$ is lithium, magnesium or aluminum and

R$^1$ to R$^3$ are each C$_1$–C$_{10}$-alkyl.

Particularly preferred metal compounds of the formula I are n-butyllithium, n-butyl-n-octylmagnesium, n-butyl-n-heptylmagnesium, tri-n-hexylaluminum, triisobutyl-aluminum, triethylaluminum and trimethylaluminum.

If the component D) is used, it is preferably present in the catalyst system in an amount of from 800:1 to 1:1, in particular from 500:1 to 50:1 (molar ratio of M$^1$ from I to transition metal M from IV).

The components B) and C) and, if required, A) and D) are used together as a metallocene-containing catalyst system for the preparation of the ethylene copolymers b) to be used according to the invention.

In addition to the propylene homopolymer a) and the ethylene copolymer b), the novel propylene polymers also contain, if required, a nucleating agent c) which, by definition, accelerates nucleation during crystallization from the melt. The nucleating agents used are those conventionally employed in plastics technology, for example mineral additives, such as talc, silica or kaolin, or organic compounds, such as mono- and polycarboxylic acids and salts thereof, or polymers such as ethylene acrylate copolymers.

Nucleating agents c) which may be present in the novel propylene polymers may be, inter alia, dibenzylidene sorbitol and its C$_1$–C$_8$-alkyl-substituted derivatives, for example methyldibenzylidene sorbitol or dimethyldibenzylidene sorbitol, as well as salts of diesters of phosphoric acid, for example sodium 2,2'-methylenebis(4,6-di-tert-butylphenyl)phosphate.

A particularly preferably used nucleating agent c) in the novel propylene polymer is finely divided talc. The finely divided talc should preferably have a mean particle size of less than 5 μm, in particular less than 3 μm.

The nucleating agents c) described above are conventional commercially available additives. In addition to the nucleating agents c), conventional stabilizers, for example calcium stearate and phenolic antioxidants, heat stabilizers, UV stabilizers and processing assistants may be added to the novel propylene polymer.

If nucleating agents c) are present in the novel propylene polymers, the propylene homopolymer a), the ethylene-copolymer b) and the nucleating agent c) are usually used in ratios such that from 0.05 to 1.5, in particular from 0.05 to 1.0, particularly preferably from 0.1 to 0.5, parts by weight of nucleating agent b) are employed per 100 parts by weight of the propylene copolymer a) and of the ethylene copolymer b).

The novel propylene polymers are prepared by mixing the nucleating agent c), which may be used, and the ethylene copolymer b) with the propylene homopolymer a) in one of the apparatuses usually used in plastics processing for mixing substances, for example in a drum mixer, a mill, a screw extruder, a disk extruder, a roll mill or a kneader. The propylene homopolymer a), the ethylene copolymer b) and, if required, the nucleating agent c) are mixed with one another in the mixing apparatus usually at from 200 to 250° C., in particular from 210 to 240° C. The mixing process is carried out as a rule at from 1 to 100 bar and with an average residence time of from 0.5 to 60 minutes. The exact values for the pressure and the average residence time are dependent on the mixing apparatuses used in each case.

Furthermore, the nucleating agent c) may also be sprayed onto the propylene homopolymer a) and onto the ethylene copolymer b).

The novel propylene polymers are distinguished, inter alia, by very high rigidity and flowability in combination with good impact strength. They are moreover readily processable and have only very little tendency to white fracture. Owing to the low tendency to white fracture, the novel propylene polymers are also particularly suitable for utility articles where the appearance plays a role. They can also be used generally as films, fibers and moldings.

EXAMPLES

Examples 1 to 9 and Comparative Examples A to F

The following polymers were used:

a$_1$) Propylene homopolymer having a melt flow index (MFR) of 12.8 g/10 min., at 230° C. and under a weight of 2.16 kg, according to ISO standard 1133, and an isotacticity index of 98.6% in xylene according to ISO standard 6427b).

a$_2$) Propylene homopolymer having a melt flow index (MFR) of 10.7 g/10 min., at 230° C. and under a weight of 2.16 kg, according to ISO standard 1133, and an isotacticity index of 96.7% in xylene according to ISO standard 6427b).

b$_1$) Ethylene copolymer containing 10% of polymerized but-1-ene, having a density of 0.903 g/cm$^3$ and a melt flow index (MFR) of 3.9 g/10 min., at 230° C. and under a weight of 2.16 kg, according to ISO standard 1133, prepared with the aid of a metallocene-containing catalyst based on a complex of the general formula IV b.

b$_2$) Ethylene copolymer containing 17% of polymerized but-1-ene, having a density of 0.891 g/cm$^3$ and a melt flow index (MFR) of 3.7 g/10 min., at 230° C. and under a weight of 2.16 kg, according to ISO standard 1133, prepared with the aid of a metallocene-containing catalyst based on a complex of the general formula IV b.

b$_3$) Ethylene copolymer containing 19% of polymerized but-1-ene, having a density of 0.878 g/cm$^3$ and a melt flow index (MFR) of 6.7 g/10 min., at 230° C. and under a weight of 2.16 kg, according to ISO standard 1133, prepared with the aid of a metallocene-containing catalyst based on a complex of the general formula IV b.

$b_4$) Ethylene copolymer containing 24% of polymerized oct-1-ene, having a density of 0.870 g/cm$^3$ and a melt flow index (MFR) of 2.3 g/10 min., at 230° C. and under a weight of 2.16 kg, according to ISO standard 1133, prepared with the aid of a metallocene-containing catalyst based on a complex of the general formula IV b.

$b_5$) Ethylene copolymer containing 25% of polymerized oct-1-ene, having a density of 0.868 g/cm$^3$ and a melt flow index (MFR) of 1.0 g/10 min., at 230° C. and under a weight of 2.16 kg, according to ISO standard 1133, prepared with the aid of a metallocene-containing catalyst based on a complex of the general formula IV b.

$b_6$) Ethylene copolymer containing 24% of polymerized oct-1-ene, having a density of 0.870 g/cm$^3$ and a melt flow index (MFR) of 9.0 g/10 min., at 230° C. and under a weight of 2.16 kg, according to ISO standard 1133, prepared with the aid of a metallocene-containing catalyst based on a complex of the general formula IV b.

$b_7$) Ethylene/propylene copolymer containing 30% of polymerized propylene, having a density of 0.890 g/cm$^3$ and a melt flow index (MFR) of 0.3 g/10 min., at 230° C. and under a weight of 2.16 kg, according to ISO standard 1133, prepared with the aid of a Ziegler-Natta catalyst.

The polymers were mixed in a ZSK 30 twin-screw extruder from Werner & Pfleiderer having a length/diameter ratio of 33. The polymers of Examples 1–9 and of Comparative Examples A–D which were used were fed together with 0.35 part by weight of finely divided talc to the extruder and mixed therein at about 230° C.

In Comparative Examples E and F, block copolymers of propylene which had been prepared in a two-stage process were used. A propylene homopolymer was produced in a first step similarly to the process described in EP-A 515 855, and a mixture of propylene and ethylene was polymerized onto said homopolymer in a second step.

The following products each provided with 0.35 part by weight, based on 100 parts by weight of the propylene homopolymer $V_1$ or $V_2$, of a finely divided talc were used:

$V_1$) Propylene/ethylene copolymer consisting of 90 parts by weight of a propylene homopolymer and 10 parts by weight of an ethylene/propylene copolymer containing 55% by weight of polymerized ethylene.

$V_2$) Propylene/ethylene copolymer consisting of 86 parts by weight of a propylene homopolymer and 14 parts by weight of an ethylene/propylene copolymer containing 50% by weight of polymerized ethylene.

The composition of the polymers used in Examples 1–9 and in Comparative Examples A–F and the results obtained are listed in Tables 1 and 2.

The results shown in Tables 1 and 2 were determined as follows:

Determination of the melt flow index (MFR):
    according to ISO standard 1133, at 230° C. and under a weight of 2.16 kg.

Determination of the modulus of elasticity (tensile modulus of elasticity):
    according to ISO standard 527-2, at a measuring temperature of 23° C.

Determination of the rigidity, shear modulus:
    according to ISO standard 6721-2, at a measuring temperature of 23° C.

Determination of the impact strength:
    according to ISO standard 179/1eU, at a measuring temperature of 23° C., 0° C. and –20° C.

Determination of the white fracture:

The white fracture behavior was assessed by two methods. In the calotte method, the white fracture was determined with the aid of a falling dart apparatus according to DIN 53 443 Part 1, a falling dart having a mass of 250 g, an impact element of 5 mm diameter and a calotte radius of 25 mm being used. The height of fall was 50 cm.

The test specimen used was an injection molded circular disk having a diameter of 60 mm and a thickness of 2 mm. The test specimen was injection molded at a melt temperature of 250° C. and a mold surface temperature of 30° C.

The test was carried out at 23° C. and 60° C., each test specimen being subjected to only one impact test. First, the test specimen was placed on a support ring without the latter being clamped, and the falling dart was then released. To determine a mean value, 5 test specimens were tested in each case.

The diameter of the visible white fracture mark is stated in mm and was determined by measuring it in the direction of flow and at right angles thereto on the side of the circular disk which faces away from the impact and determining the mean value from the two values.

In the determination by the volume method, the increase in volume at 23° C. during deformation due to tensile stresses was measured. The method was described in detail by F. Ramsteiner (Acta Polymerica 42 (1991), 584–589). The values (determined as $d(V/V_0)/d\epsilon$) may be from 0 to 1, low values indicating a small increase in volume and hence little tendency to white fracture.

TABLE 1

| Example | | 1 | 2 | 3 | 4 | 5 | 6 | 7 | 8 | 9 |
|---|---|---|---|---|---|---|---|---|---|---|
| Polymer[a] | Parts by | a1) | a1) | a1) | a1) | a1) | a1) | a1) | a1) | a1) |
| Amount of polymer[a] | weight | 90 | 85 | 80 | 75 | 90 | 90 | 90 | 90 | 90 |
| Polymer[b] | Parts by | b1) | b1) | b1) | b1) | b2) | b3) | b4) | b5) | b6) |
| Amount of polymer[b] | weight | 10 | 15 | 20 | 25 | 10 | 10 | 10 | 10 | 10 |
| MFR 230/2.16[a] | g/10 min | 12.2 | 10.5 | 10.8 | 9.7 | 11.9 | 13.0 | 12.0 | 11.1 | 13.7 |
| Shear modulus[b] | MPa | 850 | 740 | 670 | 570 | 780 | 760 | 820 | 790 | 790 |
| Tensile modulus of elasticity[c] | MPa | 1580 | 1510 | 1430 | 1280 | 1530 | 1540 | 1510 | 1510 | 1510 |

TABLE 1-continued

| Example | | 1 | 2 | 3 | 4 | 5 | 6 | 7 | 8 | 9 |
|---|---|---|---|---|---|---|---|---|---|---|
| Impact strength[d] | | | | | | | | | | |
| 23° C. | kJ/m² | 152 | NF[*] | NF[*] | NF[*] | 210 | NF[*] | NF[*] | 156 | NF[*] |
| 0° C. | kJ/m² | 76 | 114 | 128 | 158 | 73 | 92 | 86 | 81 | 98 |
| −20° C. | KJ/m² | 29 | 47 | 59 | 82 | 26 | 28 | 36 | 55 | 38 |
| White fracture | | | | | | | | | | |
| Volume method | | 0.23 | 0.18 | 0.16 | 0.19 | 0.21 | 0.23 | 0.19 | 0.30 | 0.21 |
| Calotte method 23° C. | | 7.2 | 7.2 | 7.1 | 6.4 | 6.5 | 5.3 | 8.0 | 10.6 | 5.0 |
| Calotte method 60° C. | | 7.8 | 7.7 | 7.6 | 7.3 | 9.5 | 10.0 | 11.6 | 12.8 | 9.5 |

[a] according to ISO standard 1133, at 23° C. and 2.16 kg
[b] according to ISO standard 6721-2, at 23° C.
[c] according to ISO standard 527-2, at 23° C.
[d] according to ISO standard 179/1eU
[*] no fracture

TABLE 2

| Comparative Examples | | A | B | C | D | E | F |
|---|---|---|---|---|---|---|---|
| Polymer[a] | % by weight | a2) | a2) | a2) | a1) | V₁) | V₂) |
| Amount of polymer[a] | | 90 | 85 | 80 | 90 | 90 | 86 |
| Polymer[b] | % by weight | b1) | b1) | b1) | b7) | V₁) | V₂) |
| Amount of polymer[b] | | 10 | 15 | 20 | 10 | 10 | 14 |
| MFR 230/2.16[a] | g/10 min | 9.7 | 9.0 | 8.7 | 10.9 | 6.5 | 15.9 |
| Shear modulus[b] | MPa | 750 | 680 | 620 | 760 | 620 | 820 |
| Tensile modulus of elasticity[c] | MPa | 1430 | 1320 | 1320 | 1500 | 1290 | 1570 |
| Impact strength[d] | | | | | | | |
| 23° C. | kJ/m² | 152 | NF[*] | NF[*] | NF[*] | NF[*] | 155 |
| 0° C. | kJ/m² | 68 | 108 | 126 | 104 | 157 | 94 |
| −20° C. | KJ/m² | 21 | 38 | 56 | 62 | 115 | 61 |
| White fracture | | | | | | | |
| Volume method | | 0.23 | 0.20 | 0.17 | 0.40 | 0.37 | 0.46 |
| Calotte method 23° C. | | 7.3 | 7.2 | 7.0 | 12.6 | 16.3 | 16.2 |
| Calotte method 60° C. | | 7.8 | 7.6 | 7.6 | 15.0 | 15.4 | 15.1 |

[a] according to ISO standard 1133, at 23° C. and 2.16 kg
[b] according to ISO standard 6721-2, at 23° C.
[c] according to ISO standard 527-2, at 23° C.
[d] according to ISO-Norm 179/1eU
[*] no fracture Comparison of Tables 1 and 2 reveals, inter alia, that the novel propylene polymers (Table 1, Examples 1 to 9) are distinguished, inter alia, by a smaller tendency to white fracture and by higher rigidity (shear modulus, tensile modulus of elasticity).

We claim:

1. A propylene-containing polymer composition consisting essentially of components a) to c) which are
   a) from 75 to 95 parts by weight of a propylene homopolymer having a melt flow index of from 0.1 to 100 g/10 min., at 230° C. and under weight of 2.16 kg, according to ISO standard 1133, and an isotacticity index of at least 98% in xylene according to ISO standard 6427b, and wherein the propylene homopolymer is produced using a Ziegler-Natta catalyst which contains a titanium-containing solid component,
   b) from 5 to 25 parts by weight of an ethylene copolymer containing from 4 to 40% by weight of polymerized $C_4$–$C_{20}$-alk-1-ene and having a density of from 0.865 to 0.920 g/cm³, and
   c) from 0.05 to 1.5 parts by weight of a nucleating agent, the sum of the parts by weight of the propylene homopolymer a) and of the ethylene copolymer b) always being 100 parts by weight.

2. The composition of claim 1, wherein the ethylene copolymer b) has a melt flow index of from 1 to 30 g/10 min., at 230° C. and under a weigh of 2.16 kg, according to ISO standard 1133.

3. The composition of claim 1, wherein the ethylene copolymer is prepared
   with the aid of a metallocene-containing catalyst.

4. The composition of claim 1, wherein the propylene homopolyer a) has a melt flow index of from 0.2 to 50 g/10 min. at 230° C. and under a weight of 2.16 kg, according to ISO standard 1133.

5. The composition of claim 1, wherein the propylene homopolymer a) has an isotacticity index of from 98.0 to 99.5%.

6. The composition of claim 1, wherein the ethylene copolymer b) has a density of from 0.868 to 0.91 g/cm³.

7. The composition of claim 1, wherein the ethylene copolymer b) contains polymerized units of but-1-ene, hex-1-ene or oct-1-ene as the polymerized $C_4$–$C_{20}$-alk-1-ene.

8. The composition of claim 1, wherein the ethylene copolymer b) contains from 7 to 30% by weight of polymerized $C_4$–$C_{20}$-alk-1-ene.

9. The composition of claim 1, which contains from 75 to 90 parts by weight of the propylene homopolymer a) and from 10 to 25 parts by weight of the ethylene copolymer b).

10. The composition of claim 9 containing
    a) 80 to 90 parts by weight of the propylene homopolymer and
    b) from 10 to 20 parts by weight of the ethylene copolymer.

11. The composition of claim 10 containing from 0.1 to 0.5 parts by weight of talc.

12. The composition of claim 11 containing
    a) about 85 parts by weight of the propylene homopolymer and
    b) about 15 parts by weight of an ethylene copolymer containing 10% by weight of butene-1.

13. The composition of claim 12 wherein the propylene homopolymer has an istacticity index of 98.6%.

14. The composition of claim 1 containing only one ethylene $C_4$–$C_{20}$ alk-1-ene copolymer.

15. The composition of claim 14 wherein the $C_4$–$C_{20}$ alk-1-ene copolymer is butene-1 or 1-octene.

16. The composition of claim 11 containing
    a) about 85 parts by weight of the propylene homopolymer and
    b) about 15 parts by weight of an ethylene copolymer containing 24 or 25% by weight of octene-1.

17. The composition of claim 11 containing about
a) 85 parts by weight of the propylene homopolymer and
b) about 15 parts by weight of an ethylene copolymer containing 10–19% by weight of butene-1.

18. The composition of claim 17 wherein the density of the ethylene copolymer is 0.878 to 0.903 g/cm$^3$.

19. The composition of claim 11 wherein the melt flow index of the propylene homopolymer is from about 0.2 to about 13 g/10 min. at 230° and under a weight of 2.16 by according to ISO standard 1133.

* * * * *